No. 868,934. PATENTED OCT. 22, 1907.
P. MEAGHER.
SHIFT MECHANISM FOR AGRICULTURAL IMPLEMENTS.
APPLICATION FILED JAN. 2, 1904.
3 SHEETS—SHEET 1.
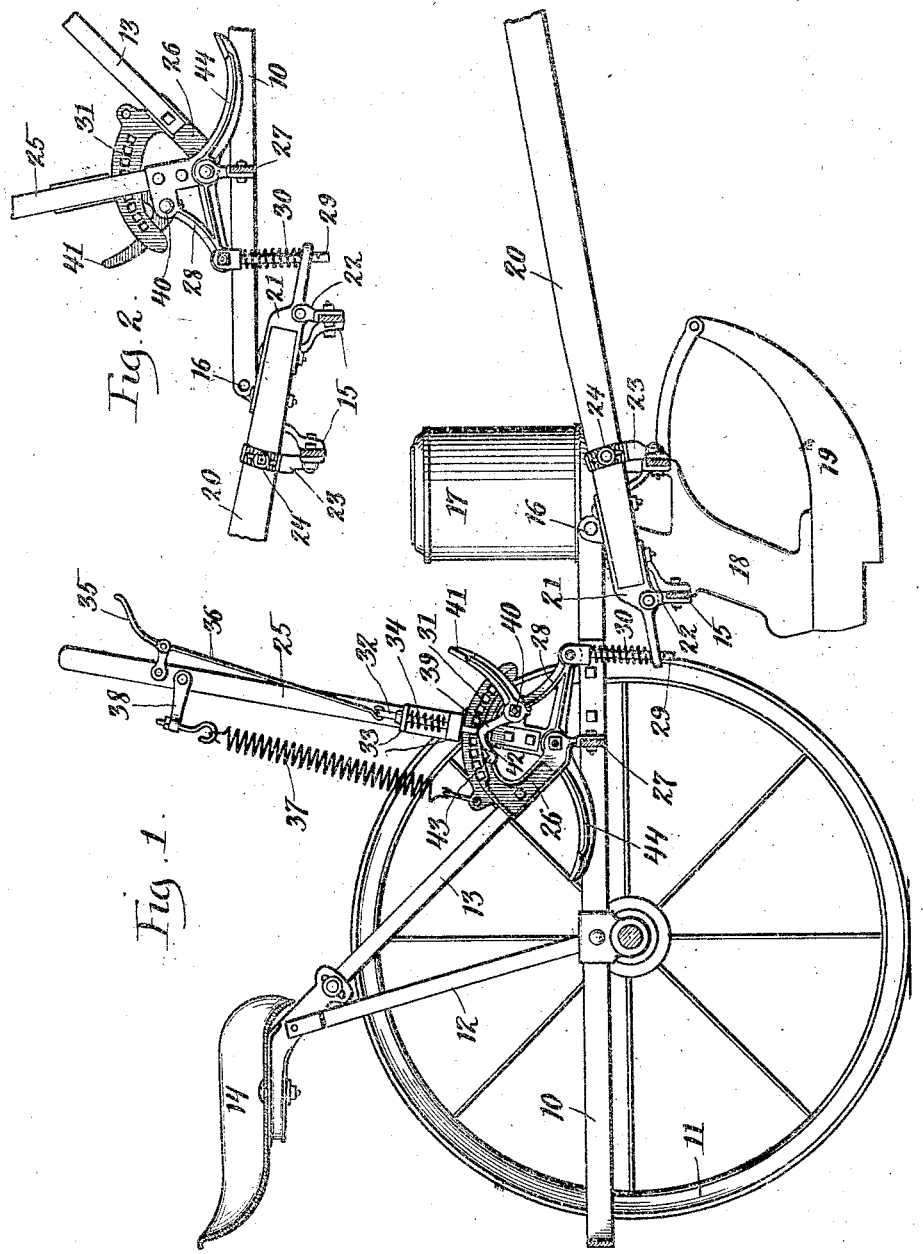
Witnesses:
Fred Erlach
Walter Schalch
Inventor:
Pierre Meagher
By Pierce & Fisher
Attorneys No. 868,934. PATENTED OCT. 22, 1907.
P. MEAGHER.
SHIFT MECHANISM FOR AGRICULTURAL IMPLEMENTS.
APPLICATION FILED JAN. 2, 1904.
3 SHEETS—SHEET 2.
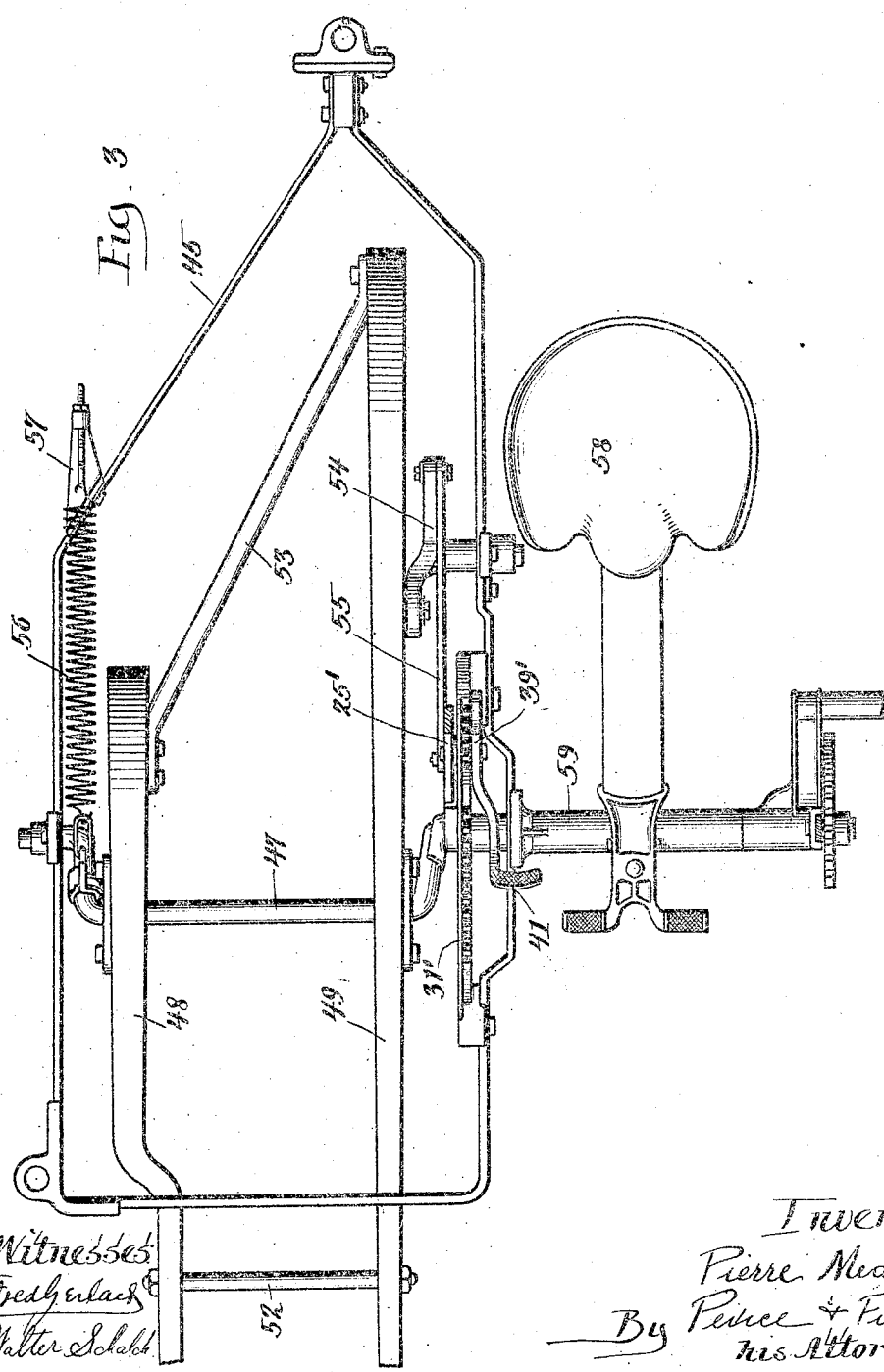

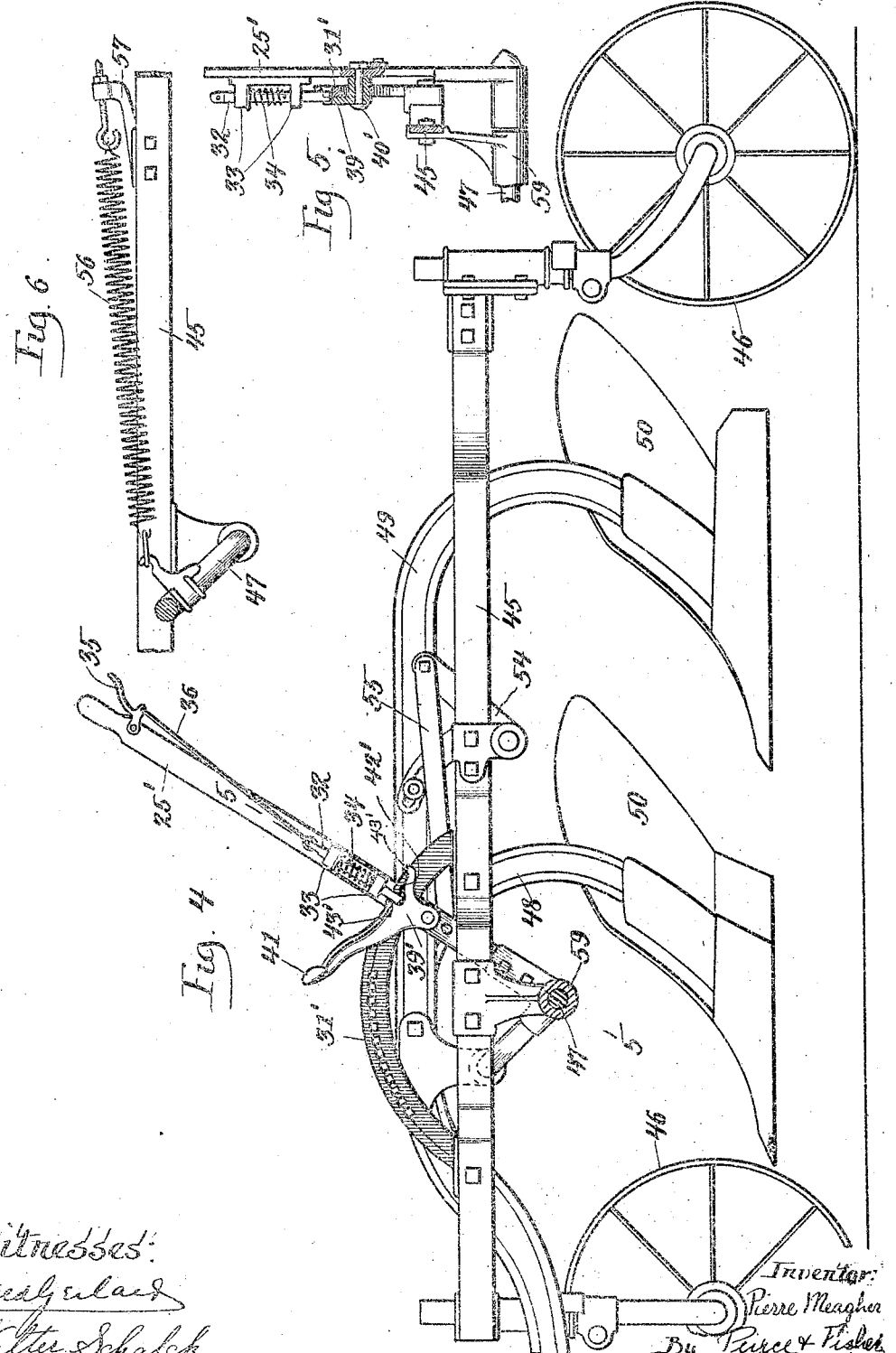

UNITED STATES PATENT OFFICE.

PIERRE MEAGHER, OF RACINE, WISCONSIN, ASSIGNOR TO J. I. CASE PLOW WORKS, OF RACINE, WISCONSIN, A CORPORATION.

SHIFT MECHANISM FOR AGRICULTURAL IMPLEMENTS.

No. 868,934.      Specification of Letters Patent.      Patented Oct. 22, 1907.

Application filed January 2, 1904. Serial No. 187,480.

*To all whom it may concern:*

Be it known that I, PIERRE MEAGHER, a citizen of the United States, and a resident of Racine, county of Racine, and State of Wisconsin, have invented certain new and useful Improvements in Shift Mechanism Agricultural Implements, of which the following is declared to be a full, clear, and exact description, reference being had to the accompanying drawings, forming part of this specification.

The improvement relates to mechanism by which the ground tools of agricultural implements are shifted to and from operative position and by which the height of the ground-tool is adjusted when in working position.

The invention seeks to provide means by which the rider can control the shift mechanism with his feet, thus leaving both hands free for the management of the team, and consists in the features of construction, combinations and arrangement of parts set forth in the following description, illustrated in the accompanying drawings and more particularly pointed out in the appended claims.

In the drawings Figure 1 is a sectional elevation of a corn planter with the improved mechanism applied thereto. Fig. 2 is a detail elevation of the shift mechanism shown in Fig. 1 looking in the opposite direction. Fig. 3 is a plan view of a sulky plow with a modified form of the improved shift mechanism applied thereto. Fig. 4 is a view in elevation of the parts shown in Fig. 3. Fig. 5 is a detail section on line 5—5 of Fig. 4. Fig. 6 is a detail view of parts shown in Fig. 3.

In the form of the invention shown in Fig. 1, the machine frame 10 is mounted on suitable ground wheels 11 and is provided with upwardly extending brace-bars 12 and 13 which carries the rider's seat 14. The runner frame 15 is pivoted as at 16 to the forward end of the main frame and carries the seed-can or hopper 17, seed discharge tube 18 and the ground tool or runner 19. The draft-tongue 20 is provided at its rear end with a piece 21 which is hinged to a bracket 22, fixed upon the rear of the runner frame. A second bracket 23 is fixed to the forward part of the runner frame and the tongue 20 is adjustably connected thereto by means of a bolt 24 passing through a slot in the bracket.

The shift mechanism for raising and lowering the ground tool or runner 19, comprises a shifter preferably in the form of the hand-lever 25, pivoted upon a bracket 26 which is fixed to the brace-bar 13, and a cross-bar 27 of the frame. The shift-lever is provided with a forwardly extending arm 28 which is yieldingly connected to the piece 21 by means of a bolt 29 and a cushion spring 30 surrounding the bolt and interposed between its head and the piece 21. By means of this connection, the shifter may be operated to raise and lower the ground tool or runner to and from working position and for adjusting the working position thereof.

For holding the shift-lever in adjusted position, the bracket 26 is provided with an arch-shaped rack-bar 31 concentric with the pivot of the shift-lever. A latch 32 is mounted to slide through guides 33 upon the shift-lever and is normally held into engagement with the teeth of the rack-bar 31 by means of a spring 34. A small hand-lever 35 is pivoted to the upper end of the shift-lever 25 and is connected to the latch 32 by a rod 36 so that the engagement of the latch with the teeth of the rack 31 may be controlled by hand. A heavy spring 37 is secured to the rear end of the rack-bar 31 and to a lug 38 upon the upper end of the shift-lever 25, so as to balance the weight of the runner frame and assists in raising it. As shown, the sliding latch 32 is mounted upon the shift-lever 25 upon the upper side of the rack-bar 31. A trip 39 for releasing the latch is provided and is preferably connected directly upon the shift-lever below the rack-bar 31, by means of a pivot bolt 40. An actuating foot-treadle 41 is provided for the trip 39 and is preferably formed in one piece therewith. The trip is provided with a cam face 42, arranged to engage and lift the latch 32 out of engagement with the teeth of the rack 31 as the trip is shifted forwardly by pressure applied upon the foot-treadle 41. A stop 43 on the trip at the end of the cam face, is arranged to engage the latch 32 to limit the relative movement of the trip upon the shift-lever.

By mounting the trip 39 directly upon the shift-lever so as to move therewith the trip is always in position to release the latch 32 in all adjustments of the shift-lever. By mounting the treadle 41 directly upon the shifter, the rider may first release the latch 32 with his foot, and as soon as the stop 43 engages the end of the latch, he may through the medium of the foot-treadle, shift the runner to the ground against the tension of the lift-spring 37. It will also be observed that the rider may release the foot treadle 41 and trip 39 at any desired point so as to permit the reëngagement of the latch 32 with the rack bar 31, which will then hold the runner frame and ground tool in the desired position. The rider may thus release the latch, shift the ground tool and effect the reëngagement of the latch to hold the ground tool in adjusted position with his foot, leaving both hands entirely free for guiding the team. Preferably also, a second foot-treadle 44 is secured to the shift-lever 25 and extends rearwardly from the pivot thereof so that the rider, by exerting pressure upon the treadle 44 with his foot, may lift the ground tool. It will be observed that the treadle 44 extends rearwardly from the pivot of the shifter while the foot-treadle 41 extends forwardly therefrom, so that by placing one foot upon one of the treadles and the other foot upon the other treadle, the rider may have complete control of the shift mechanism for the ground tool, both to raise, lower and lock the same in any desired position, while both hands are left free at all times to control the team. The rider may also of course, operate the shift mechanism by means of the hand-lever 25 in the usual manner when he desires to do so.

The sulky plow illustrated in Figs. 3 to 6 inclusive, comprises a frame 45 carried upon wheels 46 and upon which is journaled the crank-shaft 47 upon which are mounted the beams 48 and 49 of the ground tools or gang-plows 50. A shift-lever 25' is fixed to the crank-shaft 47 and serves to raise and lower the plows or ground tools to and from working position and to adjust the same when in working position, as may be desired. The beams 48 and 49 are connected by brace-rods 52 and 53 and the rearwardly extending plow beam 49 is connected at the rear to one of the arms of a bell-crank 54, which is journaled to the frame, as indicated. A connecting rod 55 extends between the other arm of the bell-crank 54 and the shift-lever 25'. A heavy lift-spring 56 extends between the crank portion of the shafts 47 and a bracket 57 fixed to the frame. The rider's seat 58 is mounted to one side of the frame upon a laterally projecting portion 59, which forms, as shown the journal-box for the shaft 47. The hand-lever 25', as in the shift mechanism previously described, is provided with a sliding latch 32, mounted to shift in guides 33 and normally held by a coiled spring 34 into engagement with the teeth of a rack-bar 31', fixed to the plow frame.
So also the shift-lever is provided with a pivoted release lever 35 connected to the latch 32 by a rod 36.

A trip 39' for releasing the latch 32, is pivotally connected by a bolt 40' to the shift-lever. This trip is provided with a cam face 42' for engaging the end of the latch 32 and shifting it out of the teeth of the rack 31', as it is shifted forward about its pivot 41'. The trip is also provided with stops 43' arranged on opposite sides of the end of the latch 32 to limit the relative movement of the trip upon the shift-lever. The actuating treadle 41 is, as shown, preferably formed in piece with the trip. By this arrangement and in the manner previously described with reference to the form shown in Fig. 1, the rider may with his foot, release the locking latch, shift the ground tools or plows to the ground and then lock the shift mechanism to hold the plows in any desired adjusted position, thus leaving both hands free for the guidance of his team in going around obstructions, turning corners and the like.

It is obvious that the improved shift mechanism may be readily adapted for controlling the ground tools of other agricultural implements and that changes may be made in the details of structure without departure from the essentials of the invention.

Having described my invention, what I claim as new and desire to secure by Letters Patent, is:—

1. In shift mechanism for agricultural implements, the combination with a ground tool, a shift-lever therefor, a latch and rack for holding said lever, of a trip for said latch pivoted to said shift-lever and provided with a foot-treadle and a stop for limiting the relative movement of said trip upon said lever.

2. In shift mechanism for agricultural implements, the combination with a ground tool and a shift-lever therefor, of a rack-bar on the machine frame, a spring-actuated, sliding latch mounted on said lever on one side of said rack-bar and arranged to engage the same, a releasing trip for said latch pivoted to said lever upon the other side of said rack-bar and a foot-treadle mounted on said trip.

3. In shift mechanism for agricultural implements, the combination with a ground tool, a lift-spring and a shifter therefor and a latch for said shifter, of a foot-treadle for tripping said latch and connected to said shifter for moving said tool to the ground against the tension of said lift-spring.

4. In shift mechanism for agricultural implements, the combination with a ground tool, a lift-spring and pivoted shift-lever therefor, of a rack on the frame, a latch for engaging said rack mounted on said lever, a trip for releasing said latch mounted on said lever and provided with a stop for limiting its movement thereon and with a foot-treadle arranged to actuate said trip and move the tool to the ground against the tension of said lift-spring.

5. In shift mechanism for agricultural implements, the combination with a ground tool, a shifter therefor and a latch for said shifter, of a pair of foot-treadles connected to said shifter for raising and lowering said ground tool, one of said treadles being arranged to control said latch.

6. In shift mechanism for agricultural implements, the combination with a ground tool, a shift-lever therefor, a latch and rack for holding said lever, of a pair of foot-treadles connected to said lever for shifting the same in opposite directions.

7. In shift mechanism for agricultural implements, the combination with a ground tool, a shift-lever therefor, a latch and rack for holding said lever, of a pair of foot-treadles connected to said lever for shifting the same in opposite directions, one of said treadles being movably mounted upon said lever and arranged to release said latch.

8. In shift mechanism for agricultural implements, the combination with a ground tool, of a shift-lever therefor, a cushion spring connection between said lever and said tool, a lift-spring connected to said lever and a latch and coöperating rack for holding said lever in adjusted position.

9. In shift mechanism for agricultural implements, the combination with a ground tool, of a shift-lever therefor, a cushion spring connection between said lever and said tool, a lift-spring connected to said lever, a latch and coöperating rack for holding said lever, a pair of foot-treadles connected to said lever for shifting the same in opposite directions, one of said treadles being movably mounted on said lever and arranged to trip said latch.

10. In an agricultural implement, the combination with the frame, rider's seat and ground tool mounted to shift to and from working position, of shift mechanism comprising a lifting foot-lever pivotally mounted on the frame and extending rearwardly toward the rider's seat, connection between said foot-lever and the ground tool, a latch for said shift mechanism connected to said foot-lever, and a forwardly extending, depressing foot-lever pivotally connected to said lifting foot-lever and having a slight shift independent thereof to release said latch, substantially as described.

11. In an agricultural implement, the combination with the frame, rider's seat and ground tool mounted to shift to and from working position, of shift mechanism comprising a lifting foot-lever pivotally mounted on the frame and extending rearwardly toward the rider's seat, an arm connected to said foot-lever, a link connecting said arm and the ground tool, a latch for said shift mechanism connected to said foot-lever and a forwardly extending, depressing foot-lever pivotally connected to said lifting foot-lever and having a slight shift independent hereof to release said latch, substantially as described.

PIERRE MEAGHER.

Witnesses:
LAWRENCE SCHIBSBY,
GEORGE H. BOLTON.